US010186974B2

(12) United States Patent
Yang et al.

(10) Patent No.: US 10,186,974 B2
(45) Date of Patent: Jan. 22, 2019

(54) MAGNETIC INTEGRATED DEVICE FOR COUPLING WITH A THREE-PHASE PARALLEL CIRCUIT AND POWER CONVERSION CIRCUIT

(71) Applicant: Huawei Technologies Co., Ltd., Shenzhen, Guangdong (CN)

(72) Inventors: Heqian Yang, Shenzhen (CN); Changsheng Pei, Shenzhen (CN); Yongtao Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 15/147,589

(22) Filed: May 5, 2016

(65) Prior Publication Data

US 2016/0254756 A1    Sep. 1, 2016

Related U.S. Application Data

(63) Continuation of application No. PCT/CN2014/074792, filed on Apr. 4, 2014.

(30) Foreign Application Priority Data

Nov. 7, 2013   (CN) .......................... 2013 1 0552297

(51) Int. Cl.
  *H02M 3/335*    (2006.01)
  *H01F 30/12*    (2006.01)
  (Continued)

(52) U.S. Cl.
  CPC ........ *H02M 3/33546* (2013.01); *H01F 27/24* (2013.01); *H01F 27/2823* (2013.01);
  (Continued)

(58) Field of Classification Search
  CPC ... H02M 3/335; H02M 3/33546; H02M 3/285
  (Continued)

(56) References Cited

U.S. PATENT DOCUMENTS

| 4,531,108 A |   | 7/1985 | Brandes |
| 5,287,288 A | * | 2/1994 | Brennen .................. H02J 3/01 |
|             |   |        | 361/35 |

(Continued)

FOREIGN PATENT DOCUMENTS

| CN | 1398412 A | 2/2003 |
| CN | 2877003 Y | 3/2007 |

(Continued)

OTHER PUBLICATIONS

Enrico Orietti et al., "Current Sharing in Three-Phase LLC Interleaved Resonant Converter", IEEE, Sep. 20, 2009, pp. 1145-1152.

*Primary Examiner* — Adolf Berhane
*Assistant Examiner* — Nusrat Quddus

(57) ABSTRACT

A magnetic integrated device is disclosed, the device includes: a first magnetic core base and a second magnetic core base that are parallel and a first magnetic core column, a second magnetic core column, and a third magnetic core column that are located between the first magnetic core base and the second magnetic core base; and a first winding, a second winding, and a third winding are wound on the first magnetic core column, the second magnetic core column, and the third magnetic core column respectively in a same manner to form a closed magnetic flux loop, where the first winding, the second winding, and the third winding are separately used for connecting to a branch of a three-phase parallel circuit, and in all branches of the three-phase parallel circuit, values of currents are the same, and a difference between each two current phases is 120 degrees.

14 Claims, 10 Drawing Sheets

(51) Int. Cl.
 *H02M 3/28* (2006.01)
 *H01F 27/24* (2006.01)
 *H01F 27/28* (2006.01)

(52) U.S. Cl.
 CPC ............ *H01F 30/12* (2013.01); *H02M 3/285* (2013.01); *H02M 3/335* (2013.01)

(58) Field of Classification Search
 USPC .......................... 363/21.02, 44–53, 125–127
 See application file for complete search history.

(56) References Cited

U.S. PATENT DOCUMENTS

| | | |
|---|---|---|
| 7,256,677 B2 | 8/2007 | Pauley et al. |
| D644,607 S | 9/2011 | Honna |
| 2003/0090355 A1 | 5/2003 | Hoglund |
| 2006/0226946 A1 | 10/2006 | Pauley, Jr. et al. |
| 2008/0186122 A1 | 8/2008 | Xu et al. |
| 2010/0220505 A1 | 9/2010 | Tsuruya |
| 2012/0075051 A1 | 3/2012 | Petter et al. |
| 2012/0106207 A1 | 5/2012 | Tsai et al. |
| 2013/0162384 A1 | 6/2013 | Lu |
| 2013/0250623 A1 | 9/2013 | Xu et al. |
| 2015/0028844 A1 | 1/2015 | Schinzel et al. |

FOREIGN PATENT DOCUMENTS

| | | |
|---|---|---|
| CN | 101051549 A | 10/2007 |
| CN | 201278509 Y | 7/2009 |
| CN | 101771351 A | 7/2010 |
| CN | 101872674 A | 10/2010 |
| CN | 102208242 A | 10/2011 |
| CN | 102611315 A | 7/2012 |
| CN | 102646494 A | 8/2012 |
| CN | 103177848 A | 6/2013 |
| CN | 103595367 A | 2/2014 |
| DE | 102012202578 A1 | 8/2013 |
| EP | 2081287 A1 | 7/2009 |
| EP | 2600512 A2 | 6/2013 |

\* cited by examiner

MAGNETIC INTEGRATED DEVICE FOR COUPLING WITH A THREE-PHASE PARALLEL CIRCUIT AND POWER CONVERSION CIRCUIT

CROSS-REFERENCE TO RELATED APPLICATION

This application is a continuation of International Application No. PCT/CN2014/074792, filed on Apr. 4, 2014, which claims priority to Chinese Patent Application No. 201310552297.8, filed on Nov. 7, 2013, both of which are hereby incorporated by reference in their entireties.

TECHNICAL FIELD

Embodiments of the present invention generally relate to the field of circuits, and in particular, to a magnetic integrated device and a power conversion circuit.

BACKGROUND

An LLC resonant circuit is a common resonant circuit (L is a symbol of an inductor, C is a symbol of a capacitor, LLC represents a resonant circuit formed by two inductors and one capacitor, and the LLC resonant circuit may also be referred to as a series-parallel resonant circuit (SPRC, Series-Parallel Resonant Circuit)). As shown in FIG. 1, main units of a typical LLC resonant circuit include a resonant inductor Lr and a transformer Tr, and the LLC resonant circuit further includes switching devices Q1 and Q2, an excitation inductor Lm of the transformer, resonant capacitors Cr1 and Cr2, a filter capacitor C, and rectifiers D1 and D2. The resonant circuit is connected to a direct current (DC) power supply, energy of the power supply is transferred to a secondary side from a primary side of the transformer in the circuit and is filtered by the filter capacitor C, and filtered energy is converted into an alternating current, and the alternating current is provided for a load R.

During an actual application, a ripple current flowing through a filter capacitor is prone to exceed a standard. Therefore, a three-phase parallel LLC power supply conversion circuit may be used to resolve a ripple current problem. The three-phase parallel LLC power supply conversion circuit is formed in parallel by three identical LLC resonant circuits with a current phase difference of 120 degrees. As shown in FIG. 2, key units of the three-phase parallel LLC power supply conversion circuit include six magnetic elements, namely three resonant inductors LR1, LR2, and LR3 and three transformers with a turn ratio of N1:N2:N2. The three LLC resonant circuits are for parallel output, a phase difference between each two circuits is 120 degrees, a difference between output load currents is 120 degrees, and a phase difference of currents that are output from a secondary side and are rectified is 360 degrees. Therefore, theoretically, output ripple currents may offset one another, that is, a ripple of equivalent currents is 0.

However, the inventor finds that, in a process of implementing the present invention, during implementation, especially in a high-power application scenario, of a three-phase parallel circuit, for example, the foregoing three-phase parallel LLC power supply conversion circuit, because parameters of components in all circuits may not be completely the same in practice, a phenomenon that an operating parameter drifts may exist, and a situation (for example, in FIG. 3, there is a difference among peak values of currents in all branches) in which a current is not equalized in each branch of the three-phase parallel circuit is caused; in this case, output currents of the circuit cannot be completely offset, and a device may even be burnt out in a serious case.

SUMMARY

In view of this, an objective of embodiments of the present invention is to provide a magnetic integrated device and a power conversion circuit, so as to resolve a problem that a current may be not equalized in each branch of a three-phase parallel circuit.

An embodiment of the present invention provides a magnetic integrated device, where the magnetic integrated device includes: a first magnetic core base and a second magnetic core base that are parallel and a first magnetic core column, a second magnetic core column, and a third magnetic core column that are located between the first magnetic core base and the second magnetic core base; and a first winding, a second winding, and a third winding are wound on the first magnetic core column, the second magnetic core column, and the third magnetic core column respectively in a same manner to form a closed magnetic flux loop, where the first winding, the second winding, and the third winding are separately used for connecting to a branch of a three-phase parallel circuit, and in all branches of the three-phase parallel circuit, values of currents are the same, and a difference between each two current phases is 120 degrees.

Preferably, two side columns are further provided between the two magnetic core bases, and the first magnetic core column, the second magnetic core column, and the third magnetic core column are located between the two side columns.

Preferably, an air gap is provided on each of the first magnetic core column, the second magnetic core column, and the third magnetic core column.

Preferably, the air gap is located in the middle or at one end of a magnetic core column where the air gap is provided.

Preferably, the three-phase parallel circuit is a three-phase parallel LLC power supply conversion circuit, each of the first winding, the second winding, and the third winding serves as a resonant inductor in a branch of the three-phase parallel LLC power supply conversion circuit.

Preferably, the magnetic integrated device further includes a fourth winding, a fifth winding, and a sixth winding, where:

the fourth winding, the fifth winding, and the sixth winding are superposed and wound on the first winding, the second winding, and the third winding respectively in a same manner; and a pair of windings on each magnetic core column of the first magnetic core column, the second magnetic core column, and the third magnetic core column form a primary side and a secondary side of a transformer in a branch of the three-phase parallel circuit.

Preferably, the three-phase parallel circuit is a three-phase parallel LLC power supply conversion circuit, each of the fourth winding, the fifth winding, and the sixth winding serves as a primary side of a transformer in a branch of the three-phase parallel LLC power supply conversion circuit, and each of the first winding, the second winding, and the third winding serves as a secondary side of the transformer corresponding to a magnetic core column where the first winding, the second winding, or the third winding is provided.

Preferably, the magnetic integrated device further includes a third magnetic core base, a fourth magnetic core column, a fifth magnetic core column, a sixth magnetic core column, a seventh winding, an eighth winding, a ninth winding, a tenth winding, an eleventh winding, and a twelfth winding, where the third magnetic core base is parallel to the first magnetic core base;

the fourth magnetic core column, the fifth magnetic core column, and the sixth magnetic core column are located between the first magnetic core base and the third magnetic core base;

the seventh winding, the eighth winding, and the ninth winding are wound on the fourth magnetic core column, the fifth magnetic core column, and the sixth magnetic core column respectively in a same manner;

the tenth winding, the eleventh winding, and the twelfth winding are superposed and wound on the seventh winding, the eighth winding, and the ninth winding respectively in a same manner; and a pair of windings on each magnetic core column of the fourth magnetic core column, the fifth magnetic core column, and the sixth magnetic core column form a primary side and a secondary side of a transformer in a branch of the three-phase parallel circuit.

Preferably, the three-phase parallel circuit is a three-phase parallel LLC power supply conversion circuit; and each of the first winding, the second winding, and the third winding serves as a resonant inductor in a branch of the three-phase parallel LLC power supply conversion circuit, each of the tenth winding, the eleventh winding, and the twelfth winding serves as a primary side of a transformer in a branch of the three-phase parallel LLC power supply conversion circuit, and each of the seventh winding, the eighth winding, and the ninth winding serves as a secondary side of the transformer corresponding to a magnetic core column where the first winding, the second winding, or the third winding is provided.

Preferably, an air gap is provided on each of the first magnetic core column, the second magnetic core column, and the third magnetic core column, and/or an air gap is provided on each of the fourth magnetic core column, the fifth magnetic core column, and the sixth magnetic core column.

An embodiment of the present invention further provides a power conversion circuit, including a switching conversion circuit, a three-phase resonant circuit, a three-phase transformer, a rectifier circuit, and a filter circuit, where the foregoing magnetic integrated device including only the first winding, the second winding, and the third winding may be used as the three-phase resonant circuit.

An embodiment of the present invention further provides a power conversion circuit, including a switching conversion circuit, a three-phase resonant circuit, a three-phase transformer, a rectifier circuit, and a filter circuit, where the foregoing magnetic integrated device including only the first winding, the second winding, the third winding, the fourth winding, the fifth winding, and the sixth winding may be used as the three-phase transformer.

An embodiment of the present invention further provides a power conversion circuit, including a switching conversion circuit, a three-phase resonant circuit, a three-phase transformer, a rectifier circuit, and a filter circuit, where the foregoing magnetic integrated device including the third magnetic core base may be used as the three-phase resonant circuit and the three-phase transformer.

Some beneficial effects of the present invention may include:

according to the embodiments of the present invention, branches of a three-phase parallel circuit interact, in a magnetic integrated device, with one another by using a coupling relationship of magnetic flux, and a change in magnetic flux in one branch results in a simultaneous adjustment in the other two branches, thereby implementing automatic current equalization, and achieving an effect of automatically balancing currents in all branches.

It should be understood that, the foregoing general descriptions and subsequent detailed descriptions are merely exemplary, and cannot limit the present invention.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

Clear embodiments in the present invention have been shown by using the foregoing accompanying drawings, and the following will describe more in detail. These accompanying drawings and textual descriptions are not intended to limit the scope of the concept of the present invention in any manner, but to explain, by referring to specific embodiments, an idea of the present invention to a person skilled in the art.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To comprehensively understand the present invention, lots of specific details are mentioned in the following descriptions, but a person skilled in the art shall understand that the present invention may be implemented without these specific details. In another embodiment, a method, a process, a component, and a circuit that are known are not described in detail to avoid that an ambiguous embodiment is unnecessarily caused.

Figure 1:
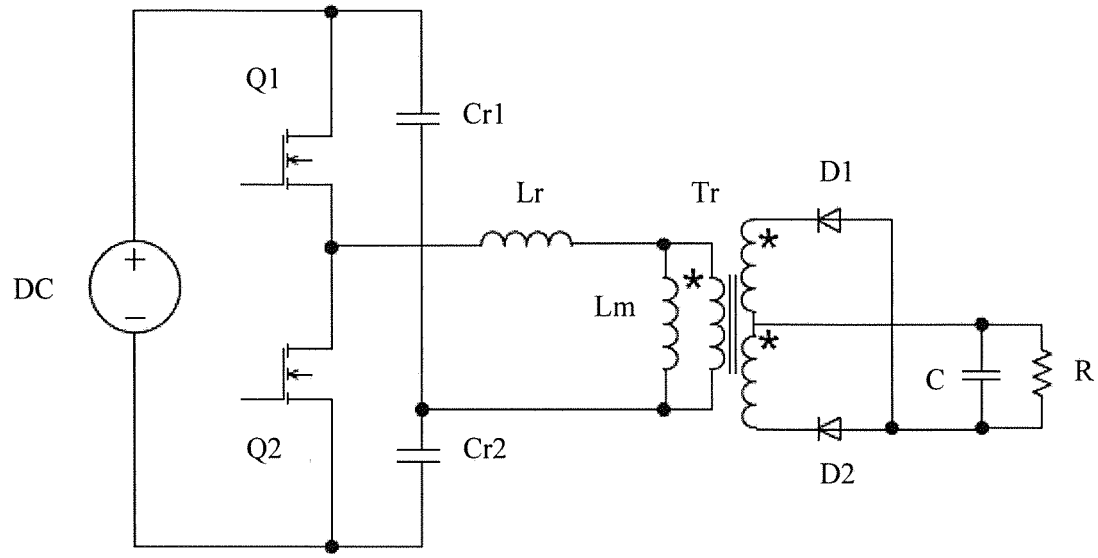
FIG. 1 is a schematic diagram of a typical LLC half-bridge resonant conversion circuit.
Figure 2:
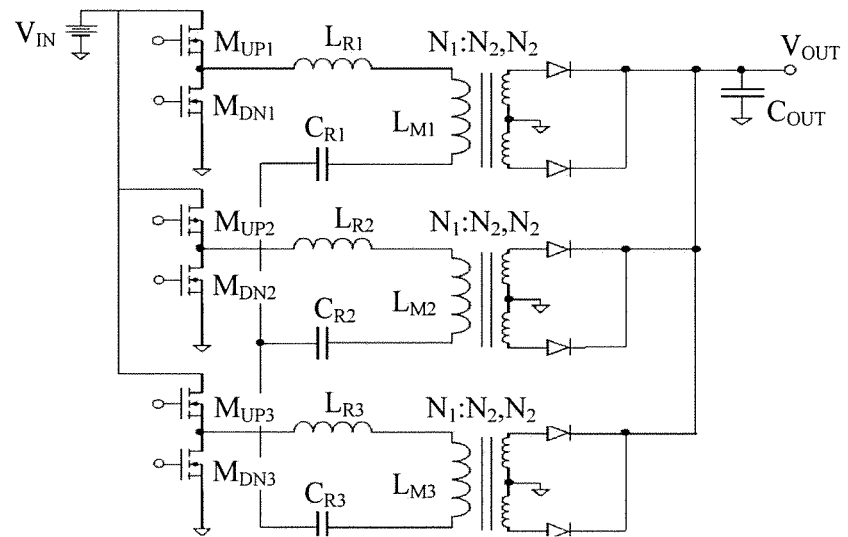
FIG. 2 is a schematic diagram of a three-phase parallel LLC power supply conversion circuit.
Figure 3:
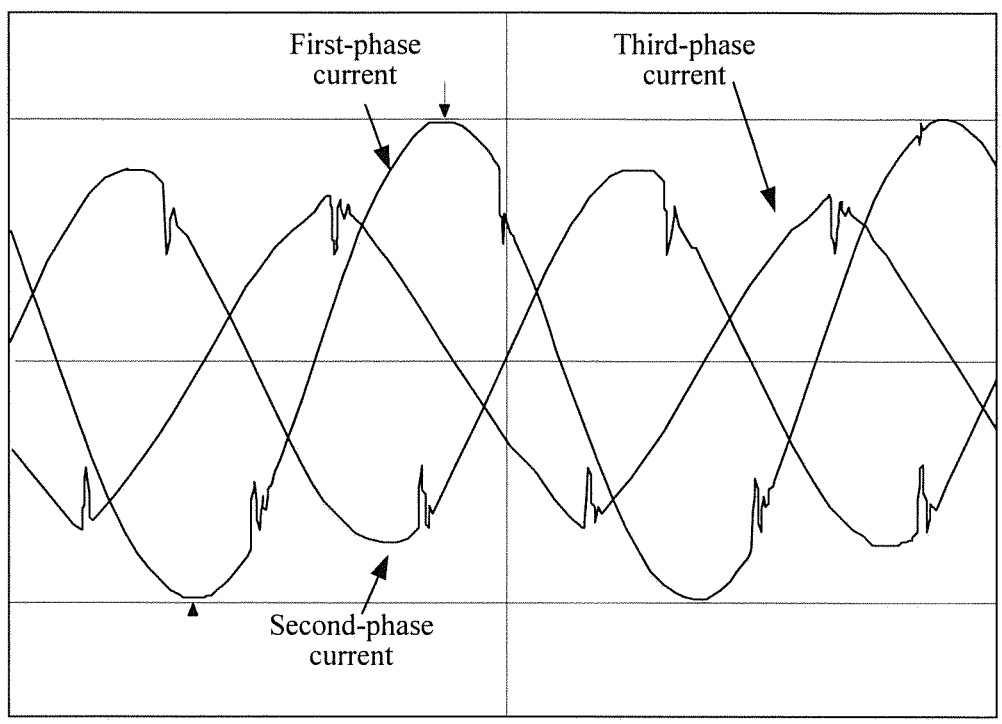
FIG. 3 is a schematic diagram of a current waveform of a transformer in each branch in the prior art.
Figure 4:
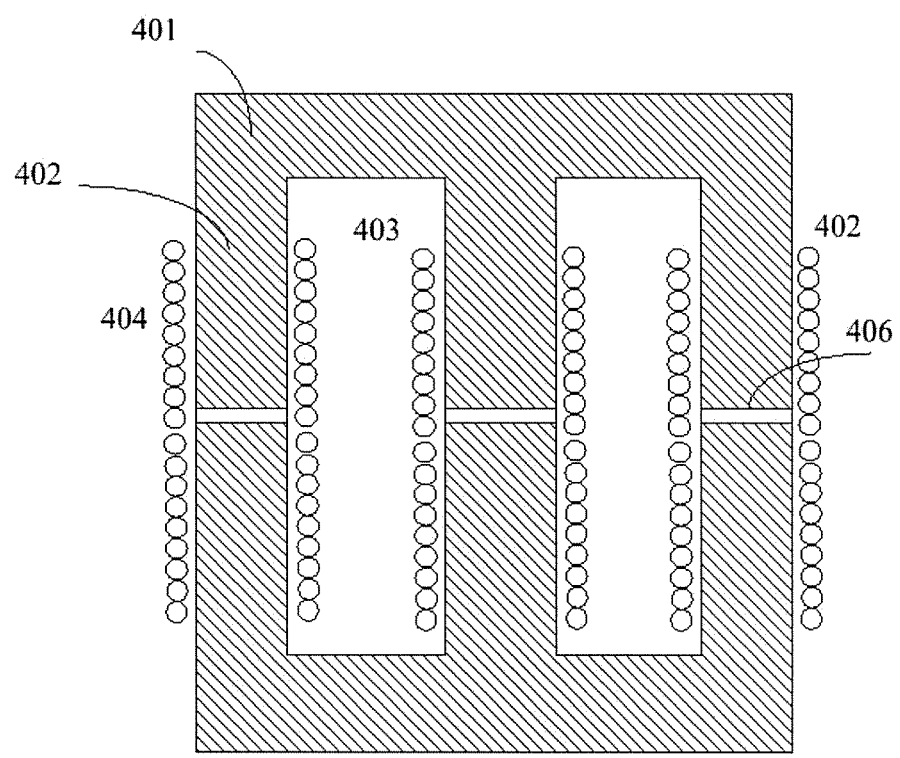
FIG. 4 is a schematic cross-sectional diagram of a magnetic integrated device according to Embodiment 1 of the present invention.

FIG. 4 is a schematic cross-sectional diagram of a magnetic integrated device according to Embodiment 1 of the present invention.

To resolve a problem that a current is not equalized occurs inevitably in each branch of a three-phase parallel circuit, this embodiment provides the magnetic integrated device.

The magnetic integrated device includes: a first magnetic core base and a second magnetic core base that are parallel and a first magnetic core column, a second magnetic core column, and a third magnetic core column that are located between the first magnetic core base and the second magnetic core base.

A first winding, a second winding, and a third winding are wound on the first magnetic core column, the second magnetic core column, and the third magnetic core column respectively in a same manner to form a closed magnetic flux loop.

The first winding, the second winding, and the third winding are separately used for connecting to a branch of the three-phase parallel circuit, and in all branches of the three-phase parallel circuit, values of currents are the same, and a difference between each two current phases is 120 degrees.

In a cross-sectional view shown in FIG. 4, 401 is one of the magnetic core bases, 402 is one of the magnetic core columns, and 403, 404, and 405 are respectively the first winding, the second winding, and the third winding. A small circle in the figure is a cross section of a coil wire, and two columns of small circles distributed on two sides of the magnetic core column represent a coil of a winding wound on the magnetic core column.

A magnetic coupling principle is used in this embodiment. A magnetic member such as a transformer or an inductor is an important constituent part of a circuit, and is also a key device for implementing energy storage and conversion, filtering, and electric isolation. In this embodiment, three magnetic members that are originally separated are integrated, and magnetic flux generated by the magnetic members interacts with one another instead of being disconnected. When three branches are coupled, a change in magnetic flux in one branch results in a simultaneous adjustment in the other two branches, thereby implementing automatic current equalization.

In this embodiment, winding manners of three coils should be the same, that is, with excitation currents of a same value injected in a same direction, directions of magnetic flux generated on the magnetic core columns wound by the windings must be the same; otherwise, the magnetic flux generated by the windings in all branches cannot offset one another, a current equalization effect cannot be achieved, a function of the circuit is affected, and that a magnetic core is saturated and that the circuit cannot normally work are even caused in a serious case.

During specific implementation, for example, when the three-phase parallel circuit is specifically a three-phase parallel LLC power supply conversion circuit, each of the first winding, the second winding, and the third winding serves as a resonant inductor in a branch of the three-phase parallel LLC power supply conversion circuit.

In addition, an air gap may be provided on each of the first magnetic core column, the second magnetic core column, and the third magnetic core column, as shown by 406 in FIG. 4. Different sizes of the air gaps may be used to adjust a coefficient of coupling among the three coils, so as to adjust a degree of balance among currents of all branches, to achieve a better current equalization effect.

Figure 5:
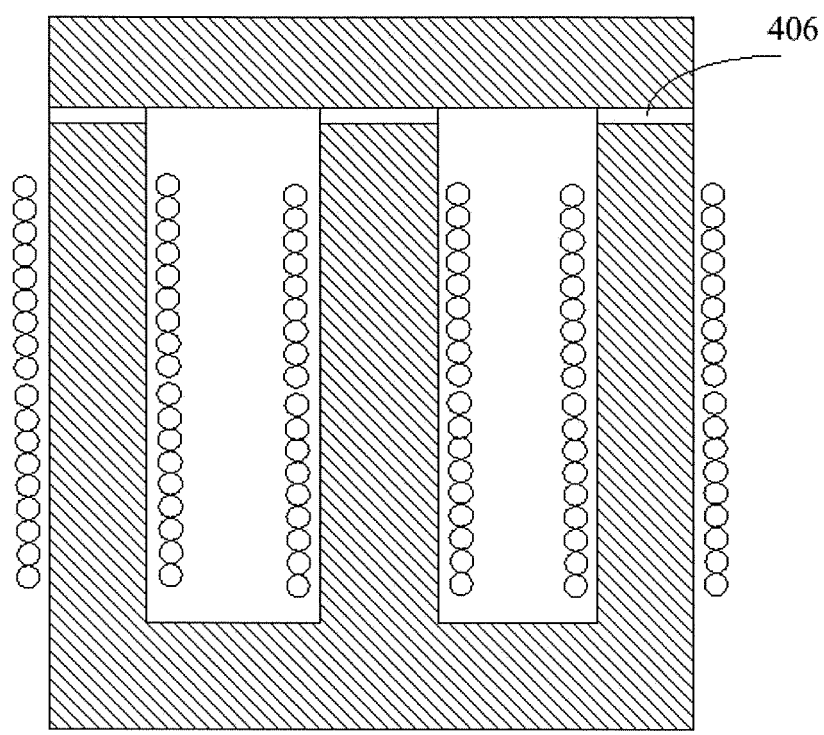
FIG. 5 is a schematic cross-sectional diagram of the magnetic integrated device according to Embodiment 1 of the present invention.

In addition, the air gap may be located in the middle or at one end of a magnetic core column where the air gap is provided. In FIG. 4, the air gap is located in the middle of the magnetic core column, but in FIG. 5, the air gap is located at one end of the magnetic core column.

During specific implementation, the magnetic integrated device may be formed by interlocking two E-shaped magnetic cores, or may be formed by interlocking one E-shaped magnetic core and one I-shaped magnetic core.

According to this embodiment of the present invention, branches of a three-phase parallel circuit interact, in a magnetic integrated device, with one another by using a coupling relationship of magnetic flux, and a change in magnetic flux in one branch results in a simultaneous adjustment in the other two branches, thereby implementing automatic current equalization, and achieving an effect of automatically balancing currents in all branches.

Figure 6:
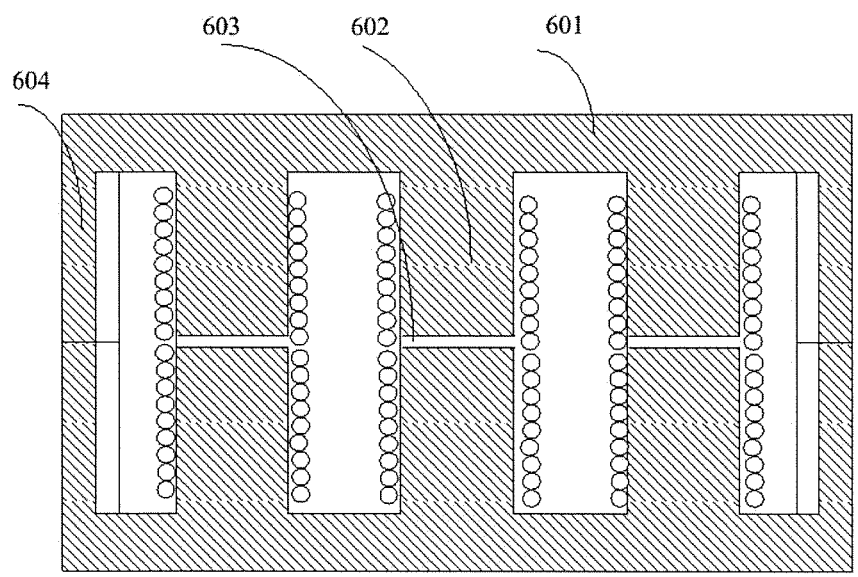
FIG. 6 is a schematic cross-sectional diagram of a magnetic integrated device according to Embodiment 2 of the present invention.

FIG. 6 is a schematic cross-sectional diagram of a magnetic integrated device according to Embodiment 2 of the present invention.

Based on Embodiment 1, this embodiment provides another schematic structural diagram of the magnetic integrated device. Compared with Embodiment 1, in this embodiment:

two side columns are further provided between the two magnetic core bases, and the first magnetic core column, the second magnetic core column, and the third magnetic core column are located between the two side columns. In addition, preferably, inner sides of the side columns may be in an arc shape that matches outlines of winding.

In FIG. 6, 601 is one of the magnetic core bases, 602 is one of the magnetic core columns, 603 is one of the air gaps, and 604 is one of the side columns. Compared with Embodiment 1, the side columns are added in this embodiment, which may reduce radiated interference of external EMI; in addition, after the side columns are added, a coupling function of magnetic flux within a magnetic core is further adjusted, which can further reduce a volume of the magnetic integrated device, further reduce loss, and further improve efficiency.

Figure 7:
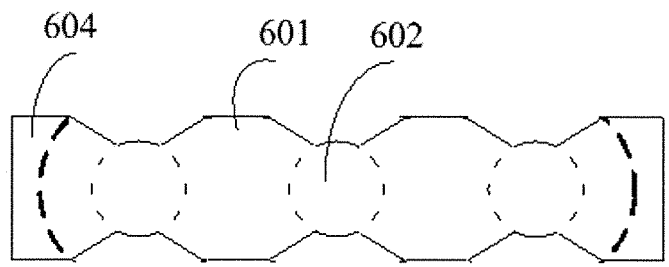
FIG. 7 is a top view of the magnetic integrated device according to Embodiment 2 of the present invention.
Figure 14:
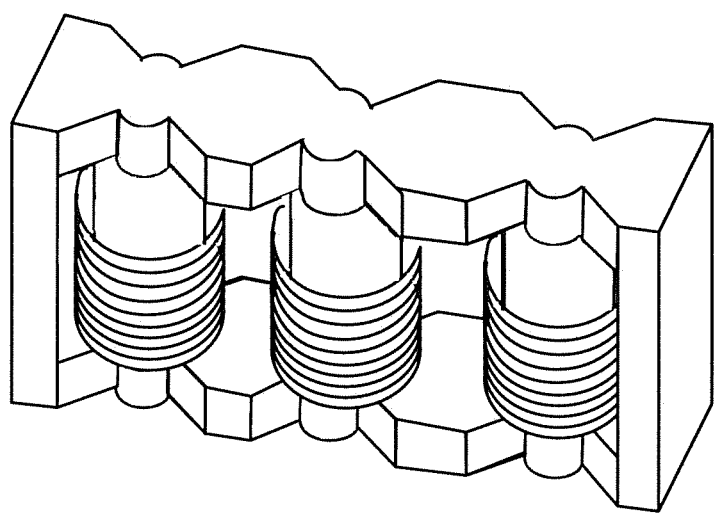
FIG. 14 is a schematic three-dimensional diagram of a magnetic integrated device according to an embodiment of the present invention.

FIG. 14 is a schematic three-dimensional diagram of the magnetic integrated device shown in FIG. 6. FIG. 7 is a top view of the magnetic integrated device shown in FIG. 6, and it can be seen from FIG. 7 that the first or second magnetic core base is in an I shape. Certainly, in some other embodiments of the present invention, the first or second magnetic core base may be designed into another shape, for example, a rectangle, according to a specific situation. These manners that can be used herein do not deviate from the spirit and the protection scope of the present invention.

According to this embodiment of the present invention, branches of a three-phase parallel circuit interact, in a magnetic integrated device, with one another by using a coupling relationship of magnetic flux, and a change in magnetic flux in one branch results in a simultaneous adjustment in the other two branches, thereby implementing automatic current equalization, and achieving an effect of automatically balancing currents in all branches.

Figure 8:
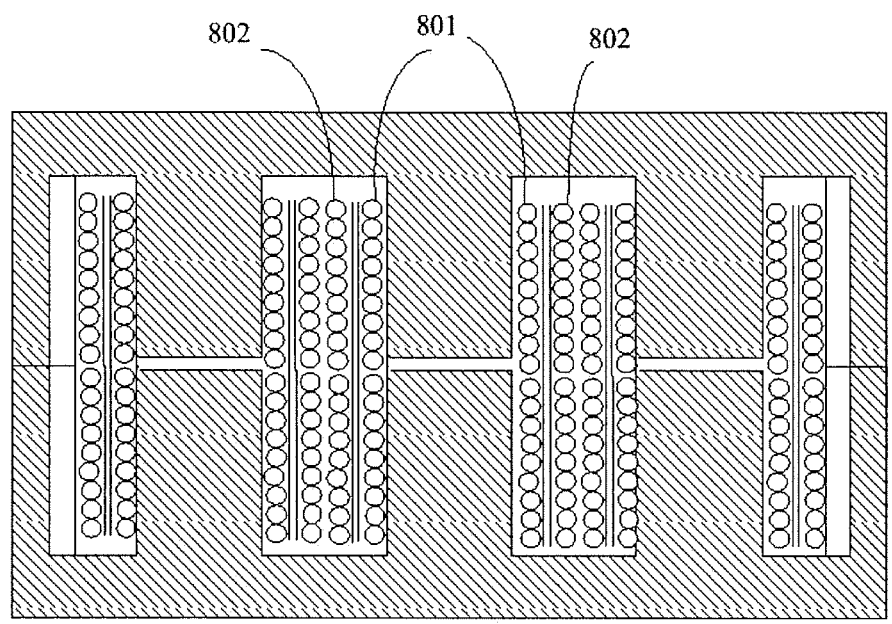
FIG. 8 is a schematic cross-sectional diagram of a magnetic integrated device according to Embodiment 3 of the present invention.

FIG. 8 is a schematic structural diagram of a magnetic integrated device according to Embodiment 3 of the present invention.

Based on Embodiment 1 or Embodiment 2, another three windings are added in this embodiment, that is, a fourth winding, a fifth winding, and a sixth winding are further included, where the fourth winding, the fifth winding, and the sixth winding are superposed and wound on the first winding, the second winding, and the third winding respectively in a same manner; and a pair of windings on each magnetic core column of the first magnetic core column, the second magnetic core column, and the third magnetic core column form a primary side and a secondary side of a transformer in a branch of the three-phase parallel circuit.

In FIG. 8, 801 is the second winding, and 802 is the fifth winding superposed and wound on the second winding.

After the three windings are added, each magnetic core column has a pair of windings instead of one winding; the magnetic integrated device has three pairs of windings instead of three windings, and therefore, the three windings may be used as three transformers. During specific implementation, for example, the magnetic integrated device in this embodiment may be used in such a way:

the three-phase parallel circuit is a three-phase parallel LLC power supply conversion circuit, each of the fourth winding, the fifth winding, and the sixth winding serves as a primary side of a transformer in a branch of the three-phase parallel LLC power supply conversion circuit, and each of the first winding, the second winding, and the third winding serves as a secondary side of the transformer corresponding to a magnetic core column where the first winding, the second winding, or the third winding is provided.

Figure 9A:
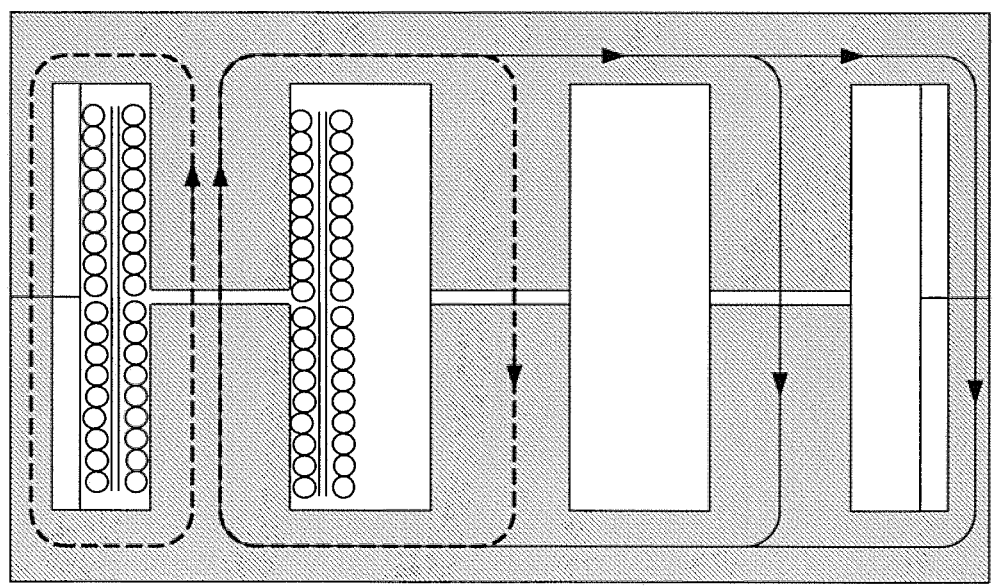
FIG. 9a to FIG. 9c are schematic diagrams of magnetic flux generated when a winding, in each branch, of the magnetic integrated device works according to Embodiment 3 of the present invention.
Figure 9B:
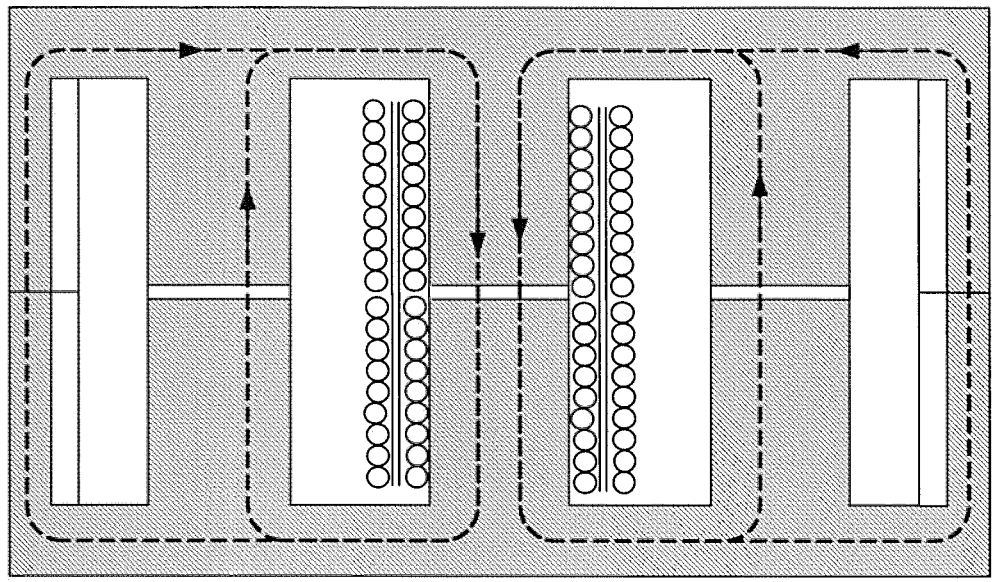
Figure 9C:
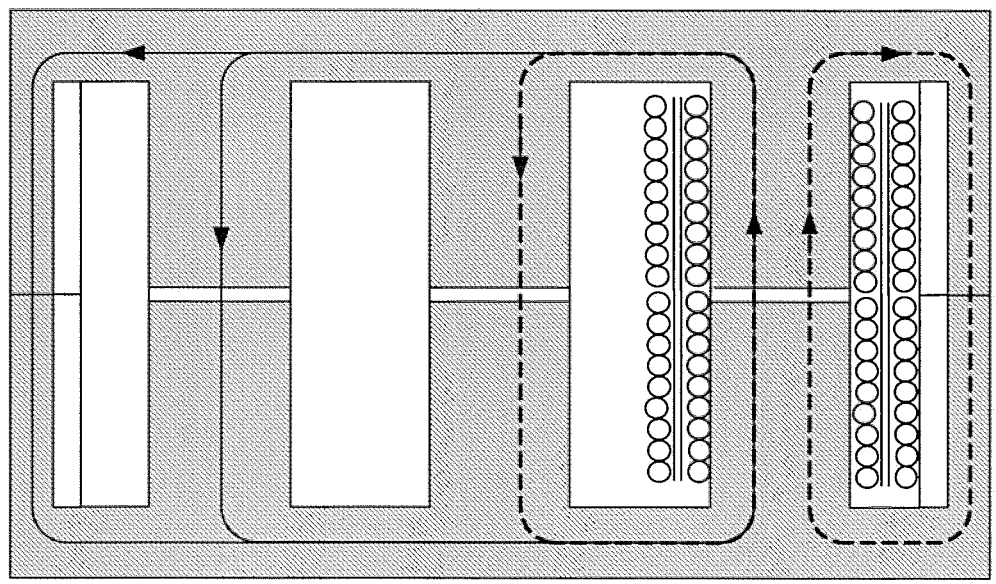

FIG. 9a is a schematic diagram of a working condition of magnetic flux in a magnetic core during work of first-phase windings (which include a first winding and a fourth winding) of the magnetic integrated device according to this embodiment; FIG. 9b is a schematic diagram of a working condition of magnetic flux in a magnetic core during work of second-phase windings (which include a second winding and a fifth winding) of the magnetic integrated device according to this embodiment; and FIG. 9c is a schematic diagram of a working condition of magnetic flux in a magnetic core during work of third-phase windings (which include a third winding and a sixth winding) of the magnetic integrated device according to this embodiment. During actual work, three phases of circuits work simultaneously; at a same moment, currents in two branches are in a same direction, and a current in the other phase is in an opposite direction. For a section of the magnetic integrated device, magnetic flux generated in the section by windings in three phases offsets one another. Actually, equivalent magnetic flux in the section becomes very small.

According to this embodiment of the present invention, branches of a three-phase parallel circuit interact, in a magnetic integrated device, with one another by using a coupling relationship of magnetic flux, and a change in magnetic flux in one phase branch results in a simultaneous adjustment in the other two branches, thereby implementing automatic current equalization, and achieving an effect of automatically balancing currents in all branches.

Figure 10:
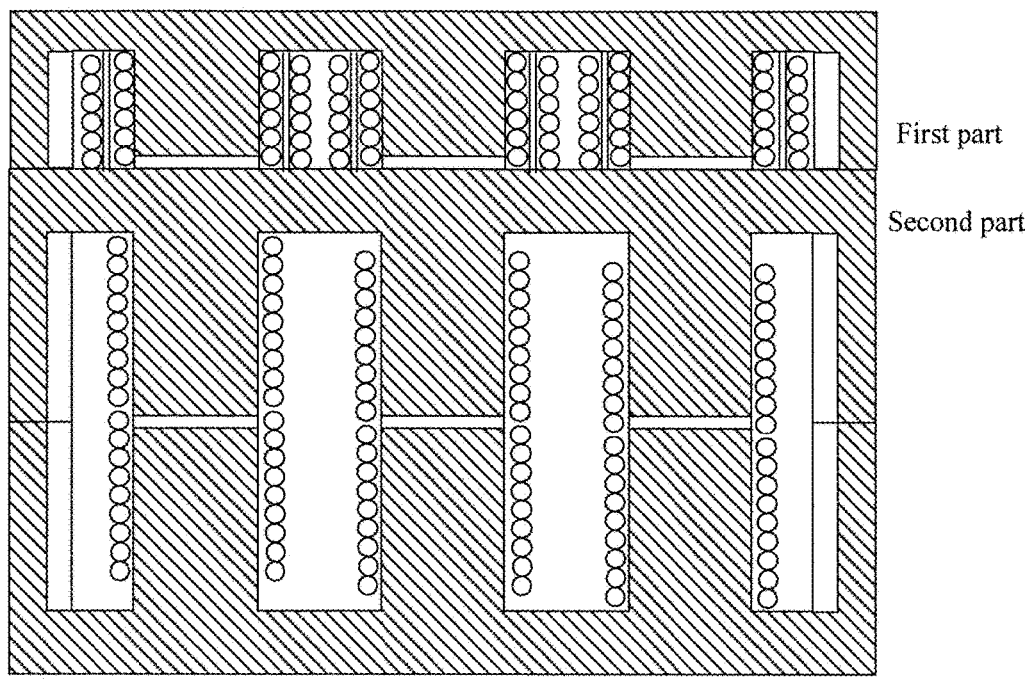
FIG. 10 is a schematic cross-sectional diagram of a magnetic integrated device according to Embodiment 4 of the present invention.

FIG. 10 is a schematic structural diagram of a magnetic integrated device according to Embodiment 4 of the present invention.

Based on the foregoing embodiments, this embodiment further integrates the foregoing embodiments. It may be deemed that the magnetic integrated device in FIG. 10 is formed by stacking two parts of magnetic integrated devices, where a second part of the magnetic integrated device is formed by interlocking two magnetic cores, and a first part of the magnetic integrated device is stacked on the second part and shares partial magnetic core base with the second part. That is, a third magnetic core base, a fourth magnetic core column, a fifth magnetic core column, a sixth magnetic core column, a seventh winding, an eighth winding, a ninth winding, a tenth winding, an eleventh winding, and a twelfth winding are further included.

The third magnetic core base is parallel to the first magnetic core base.

The fourth magnetic core column, the fifth magnetic core column, and the sixth magnetic core column are located between the first magnetic core base and the third magnetic core base.

The seventh winding, the eighth winding, and the ninth winding are wound on the fourth magnetic core column, the fifth magnetic core column, and the sixth magnetic core column respectively in a same manner.

The tenth winding, the eleventh winding, and the twelfth winding are superposed and wound on the seventh winding, the eighth winding, and the ninth winding respectively in a same manner.

A pair of windings on each magnetic core column of the fourth magnetic core column, the fifth magnetic core column, and the sixth magnetic core column form a primary side and a secondary side of a transformer in a branch of the three-phase parallel circuit.

When the two parts of the magnetic integrated devices are stacked, during an actual application, the first part may be used as a transformer, and the second part may be used as a resonant inductor. For example, the three-phase parallel circuit is a three-phase parallel LLC power supply conversion circuit; and each of the first winding, the second winding, and the third winding serves as a resonant inductor in a branch of the three-phase parallel LLC power supply conversion circuit, each of the tenth winding, the eleventh winding, and the twelfth winding serves as a primary side of a transformer in a branch of the three-phase parallel LLC power supply conversion circuit, and each of the seventh winding, the eighth winding, and the ninth winding serves as a secondary side of the transformer corresponding to a magnetic core column where the first winding, the second winding, or the third winding is provided.

In addition, an air gap is provided on each of the first magnetic core column, the second magnetic core column, and the third magnetic core column, and/or an air gap is provided on each of the fourth magnetic core column, the fifth magnetic core column, and the sixth magnetic core column, so as to further play a role of avoiding saturation of a magnetic core and adjusting a coefficient of inductive coupling in each branch.

According to this embodiment of the present invention, branches of a three-phase parallel circuit interact, in a magnetic integrated device, with one another by using a coupling relationship of magnetic flux, and a change in magnetic flux in one branch results in a simultaneous adjustment in the other two branches, thereby implementing automatic current equalization, and achieving an effect of automatically balancing currents in all branches.

An embodiment of the present invention further provides a power conversion circuit, including a switching conversion circuit, a three-phase resonant circuit, a three-phase transformer, a rectifier circuit, and a filter circuit, where the magnetic integrated device in Embodiment 1 or Embodiment 2 is used as the three-phase resonant circuit. The power conversion circuit may be specifically a three-phase parallel LLC power supply conversion circuit.

An embodiment of the present invention further provides a power conversion circuit, including a switching conversion circuit, a three-phase resonant circuit, a three-phase transformer, a rectifier circuit, and a filter circuit, where the magnetic integrated device in Embodiment 3 is used as the three-phase transformer. The power conversion circuit may be specifically a three-phase parallel LLC power supply conversion circuit.

An embodiment of the present invention further provides a power conversion circuit, including a switching conversion circuit, a three-phase resonant circuit, a three-phase transformer, a rectifier circuit, and a filter circuit, where the magnetic integrated device in Embodiment 4 is used as the three-phase resonant circuit and the three-phase transformer. The power conversion circuit may be specifically a three-phase parallel LLC power supply conversion circuit.

Figure 11:
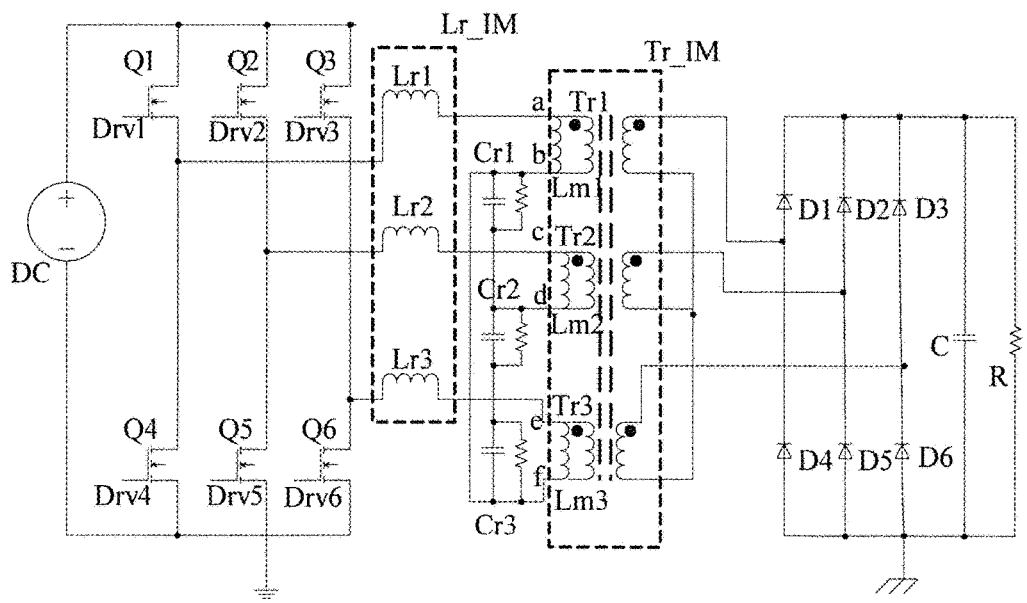
FIG. 11 is a schematic diagram of magnetic units, which can be integrated together, in a circuit according to an embodiment of the present invention.

FIG. 11 is a schematic diagram of magnetic units, which can be integrated together, in a circuit according to an embodiment of the present invention. As an example, the circuit shown in the figure is specifically a three-phase parallel LLC power supply conversion circuit. In the figure, six main magnetic units are involved, namely Lr1, Lr2, Lr3, Tr1, Tr2, and Tr3. Lr1, Lr2, and Lr3 are resonant inductors of the phases respectively, and in the present invention, the three resonant inductors may be integrated into Lr_IM, which is implemented by the magnetic integrated device shown in FIG. 4. Tr1, Tr2, and Tr3 are transformers of the phases respectively, and in the present invention, the three transformers may be integrated into Tr_IM, which is implemented by the magnetic integrated device shown in FIG. 8. The foregoing six magnetic units may even be further integrated together, which is implemented by the magnetic integrated device shown in FIG. 10. A specific circuit includes:

a switching conversion circuit, a three-phase resonant circuit, a three-phase transformer, a rectifier circuit, and a filter circuit. A specific connection relationship is as follows: The switching conversion circuit includes single bridge arms which are connected in parallel and is used to convert a direct current voltage into a square wave voltage or a step wave voltage. A first bridge arm is formed by connecting in series two switching transistors Q1 and Q4, a second bridge arm is formed by connecting in series two switching transistors Q2 and Q5, and a third bridge arm is formed by connecting in series two switching transistors Q3 and Q6. A phase difference between each two bridge arms is 120 degrees, drive signals for the switching transistors Q1 and Q4, Q2 and Q5, and Q3 and Q6 are complementary signals with a fixed duty cycle of 50%, and a frequency modulation mode is used to change frequency of the switches Q1 to Q6, so as to control an output voltage. The resonant circuit is formed by three groups of resonant inductors Lr1, Lr2, and Lr3 and resonant capacitors Cr1, Cr2, and Cr3 that are connected in series and three excitation inductors Lm1, Lm2, and Lm3 of the integrated three-phase transformer Tr_IM. Three windings on a primary side of the integrated three-phase transformer Tr_IM are connected in series to the three resonant inductors and the three resonant capacitors respectively, and a secondary side is connected to the three-phase rectifier circuit. The rectifier circuit is formed by rectifier diodes D1 to D6, and the three-phase rectifier circuit formed by D1 to D6 is connected to the secondary side of the integrated three-phase transformer Tr_IM integrated by the transformers in three phases. An output filter capacitor C is connected to an output end of the rectifier circuit, and pulse currents in a same direction provided by the secondary side of the integrated three-phase transformer Tr_IM are converted into direct current voltages for providing energy for an output load circuit R.

The resonant capacitors are connected in a triangular form, and in addition to participating in a resonant function, may also implement functions of balancing and compensating for a current in each branch. The circuit includes first-phase switching devices Q1 and Q4, a first-phase resonant inductor Lr1, a first-phase excitation inductor Lm1, a first-phase resonant capacitor Cr1, a first-phase transformer Tr1, first-phase rectifiers D1 and D4, second-phase switching devices Q2 and Q5, a second-phase resonant inductor Lr2, a second-phase excitation inductor Lm2, a second-phase resonant capacitor Cr2, a second-phase transformer Tr2, second-phase rectifiers D2 and D5, third-phase switching devices Q3 and Q6, a third-phase resonant inductor Lr3, a third-phase excitation inductor Lm3, a third-phase resonant capacitor Cr3, a third-phase transformer Tr3, and third-phase rectifiers D3 and D6.

A working principle of the circuit is as follows: Using a one-phase LLC circuit as an example, after flowing through a switching conversion circuit formed by Q1 and Q4, a direct current input voltage forms a square wave voltage, which is added to a resonant network formed by Lr1, Cr1, and Lm1; then flows through a transformer Tr1, an output rectifier circuit, and an output filter circuit, so as to obtain an output voltage, where the resonant network formed by Lr1, Cr1, and Lm1 is connected in series between a middle point of a bridge circuit and the transformer. A principle of the entire single-phase working circuit is the same as a classical LLC working principle. Working principles of branches of a three-phase circuit are the same, just with a phase difference of 120 degrees; tail ends of three resonant capacitors are connected together to form a triangular connection mode.

Figure 12:
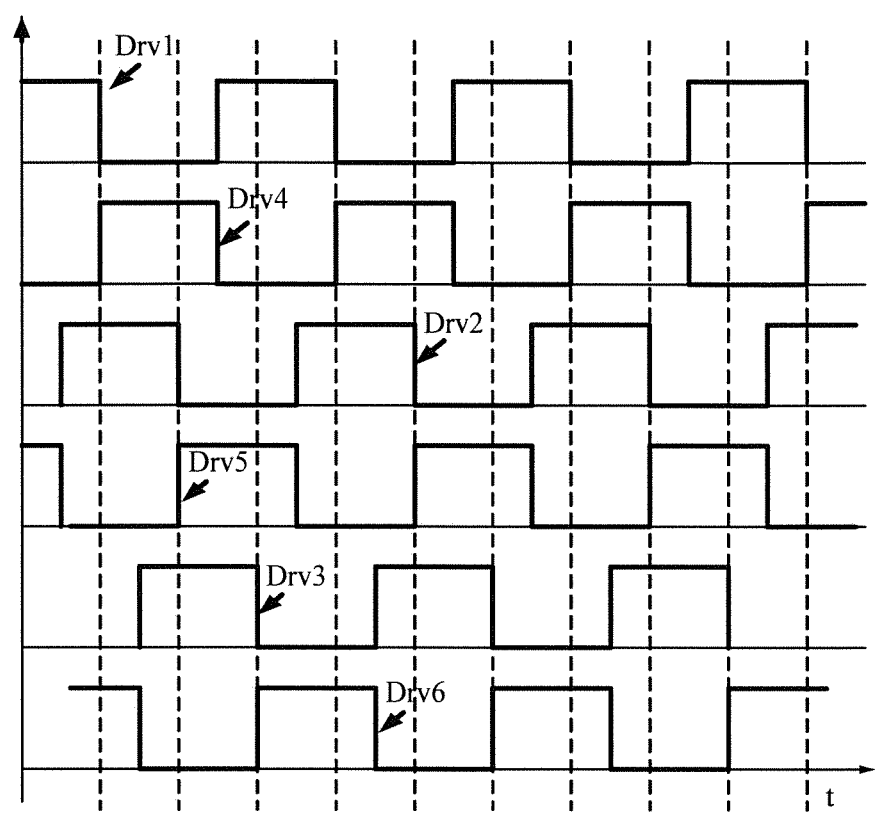
FIG. 12 is a schematic diagram of a drive waveform of a circuit according to an embodiment of the present invention.

Drv1, Drv2, Drv3, Drv4, Drv5, and Drv6 are drive waveforms sent for controlling an IC, and are respectively used to drive MOS transistors Q1, Q2, Q3, Q4, Q5, and Q6. Drv1 and Drv4 form a pair of complementary drivers, a working principle is the same as that of a half-bridge resonant circuit, and two switching transistors are conducted alternately; Drv2 and Drv5 form a pair of complementary drivers, a working principle is the same as that of the half-bridge resonant circuit, and two switching transistors are conducted alternately; and Drv3 and Drv6 form a pair of complementary drivers, a working principle is the same as that of the half-bridge resonant circuit, and two switching transistors are conducted alternately. The drive waveforms of the circuit are shown in FIG. 12.

Figure 13:
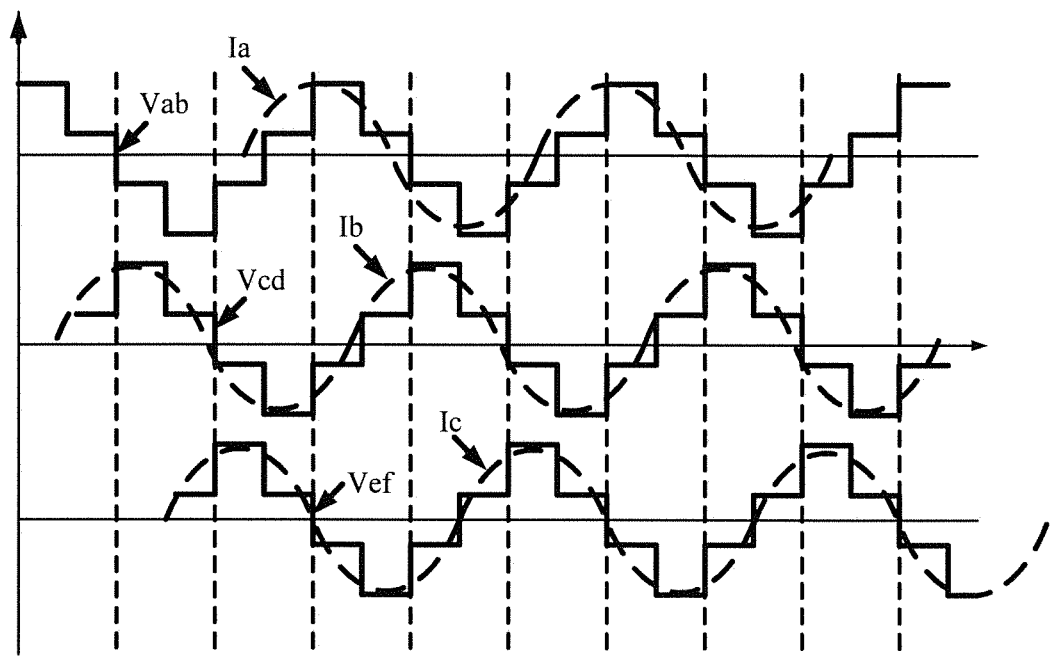
FIG. 13 is a schematic diagram of a waveform of a voltage on a primary side according to an embodiment of the present invention.

In addition, it should be noted that, a working principle of the circuit in the present invention differs greatly from that of the half-bridge resonant circuit, and it cannot be simply deemed that the circuit is formed by connecting in parallel three half-bridge LLC circuits. If three half bridges are simply connected in parallel, working states of LLC in branches are the same, waveforms of voltages added to two ends of a transformer are symmetric square waves, and each branch of the circuit works independently and does not affect one another; therefore, a problem of current imbalance mentioned above occurs, and in a serious case, the circuit is to be burnt out. For a magnetic integrated converter in a half-bridge three-phase LLC resonant circuit in the present invention, when the converter transfers power to a secondary side, an inflow point of a current of a winding on a primary side is a dotted terminal, and is connected to one end of a resonant capacitor, and an outflow point is connected to a negative end of a direct current power supply, where three resonant capacitors are connected in a way in which a positive end of a resonant capacitor is connected to a negative end of another resonant capacitor, to form a triangular connection in which the current is automatically balanced. During actual work, it can be seen from the drive waveforms that, at any moment, there are three transistors working simultaneously. For example, when the foregoing transistors Q1 and Q2 are conducted, the excitation inductors Lm1, Lm2, Lm3, and the resonant inductors Lr1, Lr2, and Lr3, and the resonant capacitors Cr1, Cr2, and Cr3 separately participate in resonance to implement an LLC function, and the current flows back to the negative end of the DC power supply through Q3. In addition, FIG. 13 shows a waveform of a voltage on a primary side of a magnetic integrated device when the magnetic integrated device is used as an integrated three-phase transformer. Vab, Vcd, and Vef are respectively waveforms of voltages added to windings on primary sides of three transformers Tr1, Tr2, and Tr3 of the magnetic integrated device Tr_IM, and Ia, Ib, and Ic are respectively waveforms of currents added to the windings on the primary sides of the three transformers Tr1, Tr2, and Tr3 of the magnetic integrated device Tr_IM. It can be seen that the waveforms in this embodiment are obviously different from those of a conventional half-bridge LLC.

It should be further noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element proceeded by "includes a . . . " does not, without more constraints, preclude the existence of additional identical elements in the process, method, article, or apparatus that includes the element.

The foregoing descriptions are merely exemplary embodiments of the present invention, but are not intended to limit the protection scope of the present invention. Specific examples are used in this specification to describe the principle and implementation manners of the present invention. The descriptions of the foregoing embodiments are merely intended to help understand the method and core idea of the present invention. In addition, a person skilled in the art may, according to the idea of the present invention, make modifications with respect to the specific implementation manners and the application scope. Therefore, the content of this specification shall not be construed as a limitation to the present invention. Any modification, equivalent replacement, or improvement made without departing from the spirit and principle of the present invention shall fall within the protection scope of the present invention.

What is claimed is:

1. A magnetic integrated device, comprising:
    a first magnetic core base and a second magnetic core base that are parallel;
    a first magnetic core column, a second magnetic core column, and a third magnetic core column that are located between the first magnetic core base and the second magnetic core base;
    a first winding, a second winding, and a third winding wound on the first magnetic core column, the second magnetic core column, and the third magnetic core column, respectively, in a same manner to faun a closed magnetic flux loop, wherein the first winding, the second winding, and the third winding are separately configured to connect to a branch of a three-phase parallel circuit, and in all branches of the three-phase parallel circuit, values of currents are the same, and a difference between each two current phases is 120 degrees;
    a fourth winding, a fifth winding, and a sixth winding superposed and wound on the first winding, the second winding, and the third winding, respectively, in a same manner; and
    a pair of windings on each magnetic core column of the first magnetic core column, the second magnetic core column, and the third magnetic core column which form a primary side and a secondary side of a transformer in a branch of the three-phase parallel circuit.

2. The magnetic integrated device according to claim 1, further comprising:
    two side columns provided between the two magnetic core bases, and wherein the first magnetic core column, the second magnetic core column, and the third magnetic core column are located between the two side columns.

3. The magnetic integrated device according to claim 1, wherein an air gap is provided on each of the first magnetic core column, the second magnetic core column, and the third magnetic core column.

4. The magnetic integrated device according to claim 3, wherein the air gap is located in the middle or at one end of a magnetic core column where the air gap is provided.

5. The magnetic integrated device according to claim 1, wherein:
    the three-phase parallel circuit comprises a three-phase parallel LLC power supply conversion circuit; and
    each of the first winding, the second winding, and the third winding respectively serves as a resonant inductor in a corresponding branch of the three-phase parallel LLC power supply conversion circuit.

6. The magnetic integrated device according to claim 1, wherein:
    the three-phase parallel circuit comprises a three-phase parallel LLC power supply conversion circuit;
    each of the fourth winding, the fifth winding, and the sixth winding serves as a primary side of a transformer in a branch of the three-phase parallel LLC power supply conversion circuit; and each of the first winding, the second winding, and the third winding respectively serves as a secondary side of the transformer corresponding to a magnetic core column where the first winding, the second winding, or the third winding is provided.

7. The magnetic integrated device according to claim 1, further comprising:
a third magnetic core base parallel to the first magnetic core base;
a fourth magnetic core column, a fifth magnetic core column, and a sixth magnetic core column located between the first magnetic core base and the third magnetic core base;
a seventh winding, an eighth winding, and a ninth winding wound on the fourth magnetic core column, the fifth magnetic core column, and the sixth magnetic core column, respectively, in a same manner;
a tenth winding, an eleventh winding, and a twelfth winding superposed and wound on the seventh winding, the eighth winding, and the ninth winding, respectively, in a same manner; and
a pair of windings on each magnetic core column of the fourth magnetic core column, the fifth magnetic core column, and the sixth magnetic core column which form a primary side and a secondary side of a transformer in a branch of the three-phase parallel circuit.

8. The magnetic integrated device according to claim 7, wherein:
the three-phase parallel circuit comprises a three-phase parallel LLC power supply conversion circuit;
each of the first winding, the second winding, and the third winding serves as a resonant inductor in a branch of the three-phase parallel LLC power supply conversion circuit;
each of the tenth winding, the eleventh winding, and the twelfth winding serves as a primary side of a transformer in a branch of the three-phase parallel LLC power supply conversion circuit; and
each of the seventh winding, the eighth winding, and the ninth winding serves as a secondary side of the transformer corresponding to a magnetic core column where the first winding, the second winding, or the third winding is provided.

9. The magnetic integrated device according to claim 7, wherein:
an air gap is provided on each of the first magnetic core column, the second magnetic core column, and the third magnetic core column; and/or
an air gap is provided on each of the fourth magnetic core column, the fifth magnetic core column, and the sixth magnetic core column.

10. A power conversion circuit, comprising:
a switching conversion circuit, a three-phase resonant circuit, a three-phase transformer, a rectifier circuit, and a filter circuit, wherein a magnetic integrated device forms the three-phase resonant circuit, and wherein the magnetic integrated device comprises:
a first magnetic core base and a second magnetic core base that are parallel;
a first magnetic core column, a second magnetic core column, and a third magnetic core column that are located between the first magnetic core base and the second magnetic core base; and
a first winding, a second winding, and a third winding are wound on the first magnetic core column, the second magnetic core column, and the third magnetic core column, respectively, in a same manner to form a closed magnetic flux loop, wherein the first winding, the second winding, and the third winding are separately used for connecting to a branch of a three-phase parallel circuit, and in all branches of the three-phase parallel circuit, values of currents are the same, and a difference between each two current phases is 120 degrees.

11. The power conversion circuit according to claim 10, wherein the magnetic integrated device further comprises:
two side columns provided between the two magnetic core bases, and wherein the first magnetic core column, the second magnetic core column, and the third magnetic core column are located between the two side columns.

12. The power conversion circuit according to claim 10, wherein an air gap is provided on each of the first magnetic core column, the second magnetic core column, and the third magnetic core column.

13. The power conversion circuit according to claim 12, wherein the air gap is located in the middle or at one end of a magnetic core column where the air gap is provided.

14. The power conversion circuit according to claim 10, wherein:
the three-phase parallel circuit comprises a three-phase parallel LLC power supply conversion circuit; and
each of the first winding, the second winding, and the third winding respectively serves as a resonant inductor in a corresponding branch of the three-phase parallel LLC power supply conversion circuit.

* * * * *